United States Patent [19]

DelVecchio et al.

[11] 4,280,114

[45] * Jul. 21, 1981

[54] DISCONTINUOUS METAL AND CERMET FILM RESISTORS AND STRAIN GAUGES

[75] Inventors: Robert M. DelVecchio, Vandergrift; Zvi H. Meiksin, Pittsburgh, both of Pa.

[73] Assignee: University of Pittsburgh, Pittsburgh, Pa.

[*] Notice: The portion of the term of this patent subsequent to Oct. 28, 1997, has been disclaimed.

[21] Appl. No.: 140,133

[22] Filed: Apr. 14, 1980

Related U.S. Application Data

[63] Continuation-in-part of Ser. No. 78,486, Sep. 24, 1979, Pat. No. 4,231,011.

[51] Int. Cl.³ .............................................. G01L 1/22
[52] U.S. Cl. ................................. 338/2; 89/610 SG; 338/226; 338/334
[58] Field of Search ........................ 338/2-6, 338/13, 226, 234, 275, 334; 73/720, 721, 726, 727; 29/610 SG, 613, 627

[56] References Cited

U.S. PATENT DOCUMENTS

| | | | |
|---|---|---|---|
| 2,423,842 | 7/1947 | McHenry | 338/2 X |
| 3,089,107 | 5/1963 | Dean | 338/2 |
| 3,222,627 | 12/1965 | Tolotta | 338/2 |
| 3,286,514 | 11/1966 | Anderson | 338/2 X |
| 3,445,800 | 5/1969 | Ambulos et al. | 338/2 |
| 3,475,712 | 10/1969 | Brown | 338/2 |
| 3,599,139 | 8/1971 | Low | 338/2 |
| 3,639,875 | 2/1972 | Brewer | 338/2 |
| 3,719,913 | 3/1973 | Dubose et al. | 338/2 |
| 3,863,192 | 1/1975 | Grey | 338/2 |
| 3,940,730 | 2/1976 | Brewer | 338/2 |
| 3,986,254 | 10/1976 | Nordstrom | 338/2 X |
| 4,023,402 | 5/1977 | Watanabe | 338/5 X |
| 4,023,562 | 5/1977 | Hynecek et al. | 73/727 X |

Primary Examiner—C. L. Albritton
Attorney, Agent, or Firm—Buell, Blenko, Ziesenheim & Beck

[57] ABSTRACT

Improved discontinuous and cermet film resistors and strain gauges are disclosed wherein the film is maintained in a constant humidity in the range of 15% to 45% thereby substantially increasing the stable life of the strain gauge.

5 Claims, 2 Drawing Figures